United States Patent
Ragan et al.

(10) Patent No.: US 10,301,124 B2
(45) Date of Patent: May 28, 2019

(54) CAN-SPREADING CONVEYOR SYSTEM AND METHODS

(71) Applicant: Laitram, L.L.C., Harahan, LA (US)

(72) Inventors: Bryant G. Ragan, Metairie, LA (US);
Jason Lagneaux, Metairie, LA (US);
James T. Cronvich, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/519,963

(22) PCT Filed: Oct. 1, 2015

(86) PCT No.: PCT/US2015/053554
§ 371 (c)(1),
(2) Date: Apr. 18, 2017

(87) PCT Pub. No.: WO2016/069190
PCT Pub. Date: May 6, 2016

(65) Prior Publication Data
US 2017/0334663 A1    Nov. 23, 2017

Related U.S. Application Data (60) Provisional application No. 62/073,580, filed on Oct. 31, 2014.

(51) Int. Cl.
*B65G 54/02* (2006.01)
*B65G 47/71* (2006.01)
(Continued)

(52) U.S. Cl.
CPC ....... *B65G 47/715* (2013.01); *B65G 21/2018* (2013.01); *B65G 47/22* (2013.01);
(Continued)

(58) Field of Classification Search
CPC ...... B65G 54/02; B65G 47/715; B65G 47/66; B65G 47/22; B65G 2811/0668; B65G 2201/0252
(Continued)

(56) References Cited

U.S. PATENT DOCUMENTS 2,697,513 A    12/1954    Krupp et al.
3,273,727 A    9/1966    Rogers et al.
(Continued)

FOREIGN PATENT DOCUMENTS

DE    9417849.6 U1    2/1995
JP    S57170351 A    10/1982
(Continued)

OTHER PUBLICATIONS

Partial Supplementary European Search Report, European Application No. 15854039.3, dated May 2018, European Patent Office, Germany.
(Continued)

*Primary Examiner* — Joseph A Dillon, Jr.
(74) *Attorney, Agent, or Firm* — James T. Cronvich (57) ABSTRACT

A conveyor system and method for spreading a mass of electrically conductive articles, such as aluminum cans, being transferred from an infeed conveyor to a wider discharge conveyor. A transfer device between the infeed and discharge conveyors uses linear induction to propel and spread electrically conductive articles across a continuous transfer surface with or without the aid of backpressure or mechanical spreading means.

12 Claims, 9 Drawing Sheets

(51) Int. Cl.
*B65G 21/20* (2006.01)
*B65G 47/66* (2006.01)
*B65G 47/22* (2006.01)
*B65B 35/44* (2006.01)
*B65B 55/24* (2006.01)

(52) U.S. Cl.
CPC .............. *B65G 47/66* (2013.01); *B65G 54/02* (2013.01); *B65B 35/44* (2013.01); *B65B 55/24* (2013.01); *B65G 2201/0252* (2013.01); *B65G 2811/0605* (2013.01); *B65G 2811/0668* (2013.01)

(58) Field of Classification Search
USPC .................. 198/458, 600; 406/71, 87–88
See application file for complete search history.

(56) References Cited

U.S. PATENT DOCUMENTS

| | | | | |
|---|---|---|---|---|
| 4,530,428 A | * | 7/1985 | Sato | B65G 11/203 193/40 |
| 4,613,805 A | | 9/1986 | Matsuo et al. | |
| 5,631,617 A | * | 5/1997 | Morishita | B60L 13/10 104/285 |
| 6,045,319 A | * | 4/2000 | Uchida | B65G 54/02 112/DIG. 2 |
| 7,165,918 B2 | * | 1/2007 | Kruse | B65H 29/52 209/644 |
| 8,025,143 B2 | * | 9/2011 | Baumstimler | B65G 47/71 198/446 |
| 8,240,455 B2 | * | 8/2012 | Weber | B65G 47/646 198/418.6 |
| 8,376,663 B2 | * | 2/2013 | Erceg | B65G 11/123 406/1 |
| 8,931,617 B2 | * | 1/2015 | Gut | B07C 5/3408 198/370.02 |
| 9,060,390 B2 | | 6/2015 | Rudnev et al. | |
| 9,696,706 B1 | * | 7/2017 | Jochim | B65D 11/20 |
| 9,738,466 B2 | * | 8/2017 | Pippin | B65G 67/24 |
| 2008/0302634 A1 | | 12/2008 | Costanzo et al. | |
| 2010/0200370 A1 | | 8/2010 | Rausch et al. | |
| 2011/0132725 A1 | * | 6/2011 | Marshall | B65G 47/66 198/600 |
| 2013/0034410 A1 | * | 2/2013 | Heise | B65G 54/02 414/222.13 |
| 2014/0102857 A1 | | 4/2014 | Heinsohn et al. | |
| 2015/0321854 A1 | * | 11/2015 | Ragan | B65G 21/2072 198/617 |
| 2017/0131309 A1 | * | 5/2017 | Pedain | B65G 54/02 |
| 2018/0162659 A1 | * | 6/2018 | Wipf | B65G 47/088 |

FOREIGN PATENT DOCUMENTS

| | | |
|---|---|---|
| JP | H0287903 A | 3/1990 |
| JP | 2006206229 A | 8/2006 |
| JP | 2014-24558 A | 2/2014 |
| JP | 2014024558 A | 2/2014 |
| WO | 01/27008 A1 | 4/2001 |
| WO | 2002057161 A2 | 7/2002 |

OTHER PUBLICATIONS

Extended European Search Report for European Application No. 15854039.3, dated Sep. 11, 2018, European Patent Office, Munich Germany.

* cited by examiner

CAN-SPREADING CONVEYOR SYSTEM AND METHODS

BACKGROUND

The invention relates generally to power-driven conveyors and more particularly to conveyors that spread out conveyed cans from one width to a wider width on a transfer device between two conveyors.

In a beverage plant, newly formed, lightweight aluminum cans are conveyed atop conveyor belts to a can washer to wash machine fluids and debris from the cans. The cans, which do not have tops yet, are conveyed on their cut edges, open end down. The infeed conveyor belt to the can-washing machine is wider than the discharge conveyor belt that conveys the cans from the can-forming machine. The wider belt is operated at a lower speed than the narrower belt to allow the cans to accumulate on the wider belt. The backpressure of the mass of cans upstream causes the cans on the slower-moving wide belt to spread across the wider width. But, as the cans are spreading, the backpressure causes some of the cans to tip over onto their sides. Seams and other discontinuities in the conveying surfaces of the belts can also catch on the thin bottom edges of the cans and cause tipping. Furthermore, the backpressure can also cause cans to permanently deform enough to be unusable. When a deadplate is used to transfer cans from one belt to the other, cans can be stranded on the deadplate in the absence of backpressure. Manual intervention is required to right tipped cans, remove damaged cans, and transfer stranded cans from the deadplate to the wider conveyor belt.

SUMMARY

One version of a conveyor system embodying features of the invention comprises a continuous conveying surface for receiving a mass of electrically conductive articles from a first conveyor for conveying the mass of electrically conductive articles confined to a first width. Means for spreading spreads the mass of electrically conductive articles from the first width to a wider second width on the continuous conveying surface. A second conveyor receives the mass of electrically conductive articles spread to the second width from the continuous conveying surface.

In another aspect of the invention, a transfer device embodying features of the invention for transferring electrically conductive articles to or from a conveyor comprises a deadplate having an upper surface extending longitudinally in a conveying direction from a first end to a second end and laterally in width from a first side to a second side. A linear-motor stator disposed under the upper surface of the deadplate generates an electromagnetic flux wave that passes through the upper surface and induces eddy currents in electrically conductive articles supported on the upper surface. The eddy currents create fields in the electrically conductive articles that interact with the electromagnetic flux wave to produce forces directing the electrically conductive articles across the upper surface of the deadplate.

In yet another aspect of the invention, a method for spreading cans comprises: (a) conveying a mass of electrically conductive articles confined to a first width on a first conveyor; (b) feeding the mass of electrically conductive articles from the first conveyor onto a continuous conveying surface; and (c) spreading the mass of electrically conductive articles from the first width to a second wider width on the continuous conveying surface.

DETAILED DESCRIPTION

Figure 1:
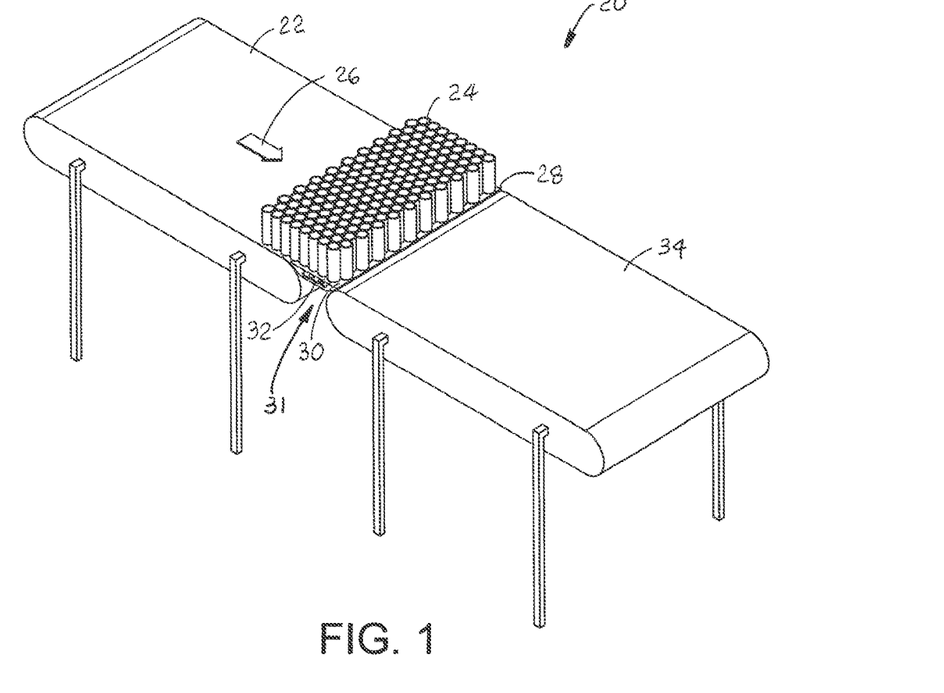
FIG. 1 is an isometric view of a transfer conveyor system embodying features of the invention for spreading cans en masse by linear induction.
Figure 2:
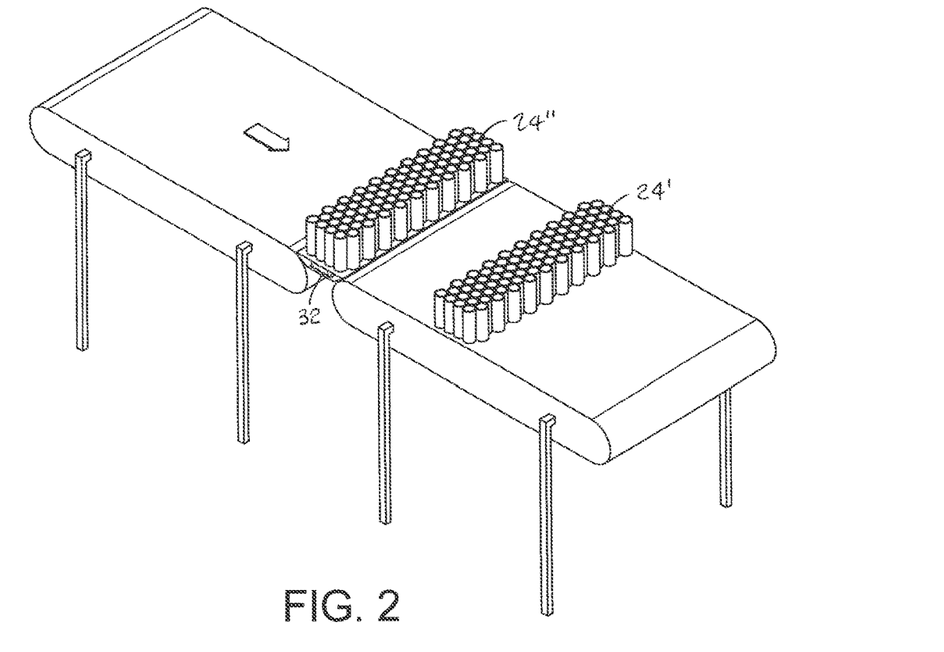
FIG. 2 is an isometric view of a transfer conveyor system as in FIG. 1 operated so as to spread cans in batches.

One version of a conveyor system embodying features of the invention is shown in FIG. 1. The conveyor system 20 has an upstream conveyor 22—a conveyor belt in this example—conveying a mass of aluminum cans 24 in a conveying direction 26 to a transfer device 28. The transfer device 28 of FIG. 1 is a deadplate having a continuous upper conveying surface 30 and positioned in a gap 31 between the upstream conveyor 22 and a downstream conveyor 34. The transfer device also includes a linear-induction-motor (LIM) stator 32 embedded in, or mounted just below, the deadplate 28. The stator 32 generates an electromagnetic flux wave that travels through the deadplate 28 in the conveying direction 26. The flux wave induces eddy currents in the electrically conductive cans 24, which act as secondaries to the stator's primary in the LIM. The eddy currents produce reaction electromagnetic fields. The interaction of the stator field and the induced reaction fields produces forces that, by Lenz's Law, push the cans across the deadplate 28 in the conveying direction 26 and onto a downstream conveyor 34. The cans 24 can be transferred across the deadplate 28 en masse by continuous energization of the stator 32. Or, as in FIG. 2, the cans can be transferred in separated groups 24', 24" by selectively energizing and de-energizing the stator 32.

As used in the description and the claims, the term "continuous . . . surface" means a surface that lacks seams or other discontinuities that are large enough to catch on a bottom feature of an article conveyed on the surface and cause the article to tip over.

Figure 3:
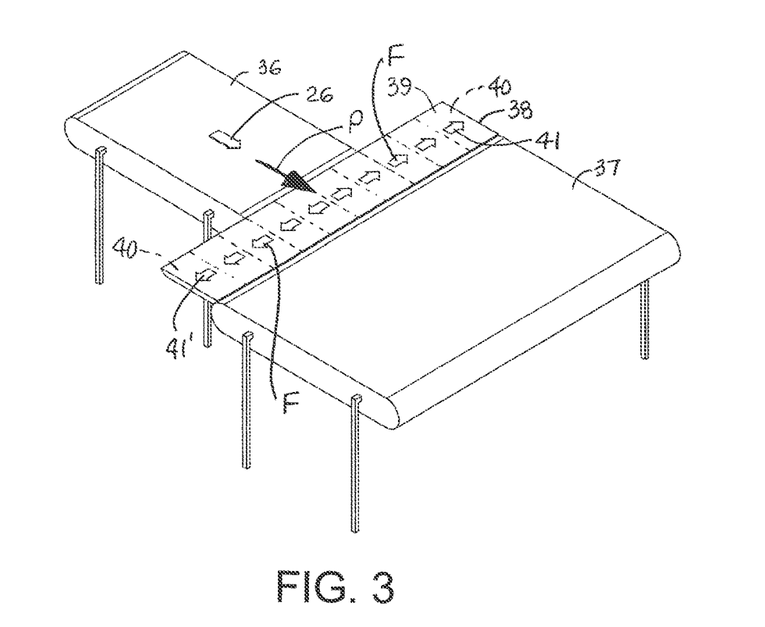
FIG. 3 is an isometric view of a transfer conveyor system as in FIG. 1 having linear-motor stators producing electromagnetic flux waves traveling in opposite directions across the width of the deadplate.

In the conveyor shown in FIG. 3, an upstream conveyor 36 having a narrow width feeds electrically conductive articles, such as aluminum cans, to a wider downstream conveyor 37 over a transfer device 38 interposed between the two conveyors. The transfer device 38 has a seamless outer conveying surface 39. Positioned below the conveying surface 39 are LIM stators 40 arranged to propagate electromagnetic flux waves transverse to the conveying direction 26, as indicated by the direction arrows 41, 41'. The transfer device's conveying surface 39 is wider than the upstream conveyor 36. The diverging traveling directions 41, 41' of the electromagnetic fields generated by the stators 40 cause the cans to spread laterally across the width of the transfer device 38. The stators on the left side of the centerline of the transfer device 38 are energized by waveforms from motor drives (not shown) that cause the left-side stators to propagate electromagnetic flux waves traveling transversely away from the centerline, while the right-side stators are energized by waveforms that cause the right-side stators to propagate electromagnetic flux waves traveling in the opposite direction. All the stators can be identical in construction and orientation. They can be operated bidirectionally by the phasing of the energizing waveforms. The backpressure P caused by the supply of cans from the upstream conveyor 36 pushes the cans across the outer conveying surface 39 of the transfer device 38 while they are pushed laterally by the electromagnetic force F. The spread mass of cans is received on the wide and slower-moving downstream conveyor 37. The transfer device 38 is one means for spreading a mass of aluminum cans or other electrically conductive articles. Alternatively, the stators 40 could be replaced by a single stator that is alternately bidirectionally energized to propagate the flux waves first in one transverse direction, then in the opposite direction, and so on, to spread the cans across the width of the transfer device 38.

Figure 4:
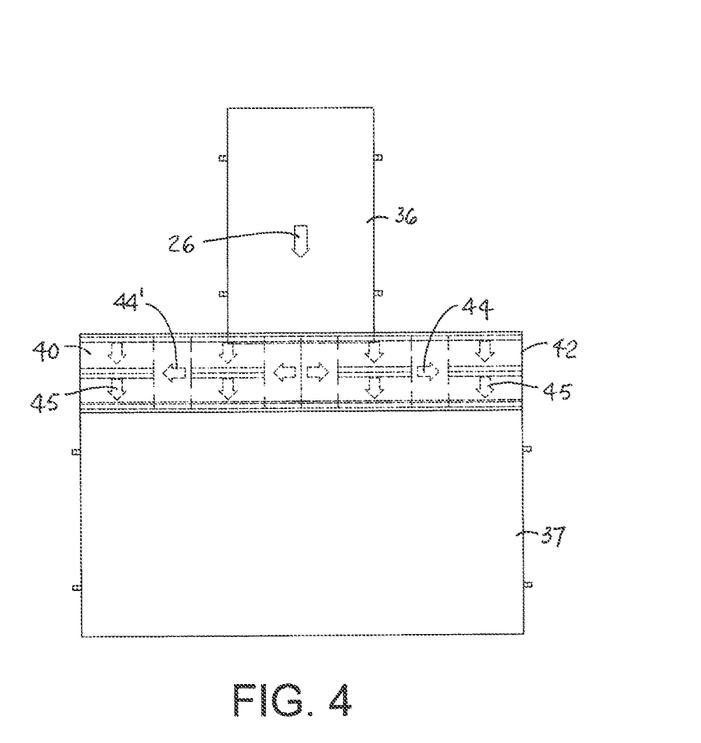
FIG. 4 is a top plan view of a transfer conveyor system as in FIG. 1 with linear-motor stators, some of which are oriented in line with the conveying direction and others of which are oriented transverse to the conveying direction.

Another means for spreading is realized by arranging the linear-motor stators 40 in a transfer device 42 as shown in FIG. 4. In this example, the transfer device 42 has LIM stators 40 arranged to propagate electromagnetic waves both perpendicular and parallel to the conveying direction 26, as indicated by arrows 44, 44' (perpendicular) and 45 (parallel). The perpendicularly oriented stators spread the cans laterally as the parallel stators advance the mass of cans in the conveying direction and onto the wider downstream conveyor 37. The stators can be selectively energized and de-energized to control the spread pattern.

Figure 5A:
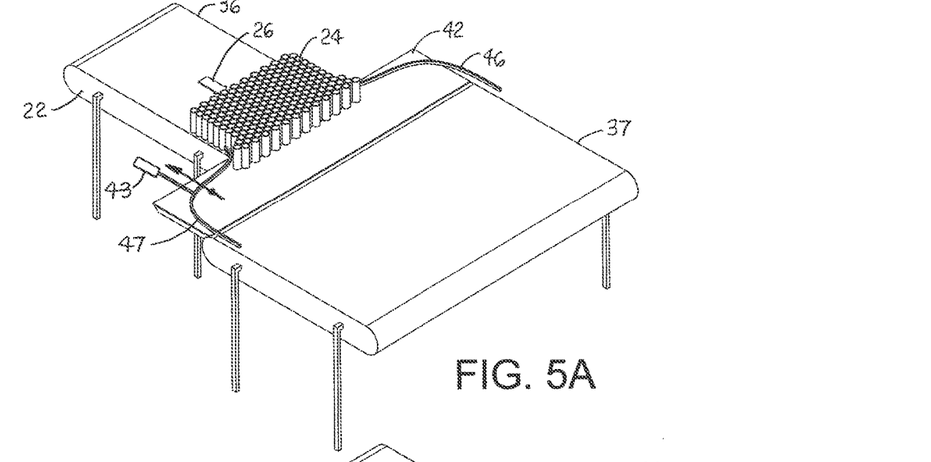
FIGS. 5A-5C are isometric views of a transfer conveyor as in FIG. 3 or 4 showing the sequence of spreading aluminum cans across a deadplate.
Figure 5B:
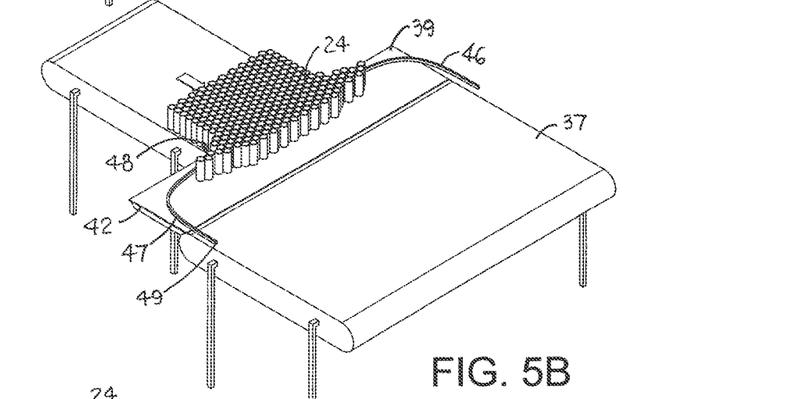
Figure 5C:
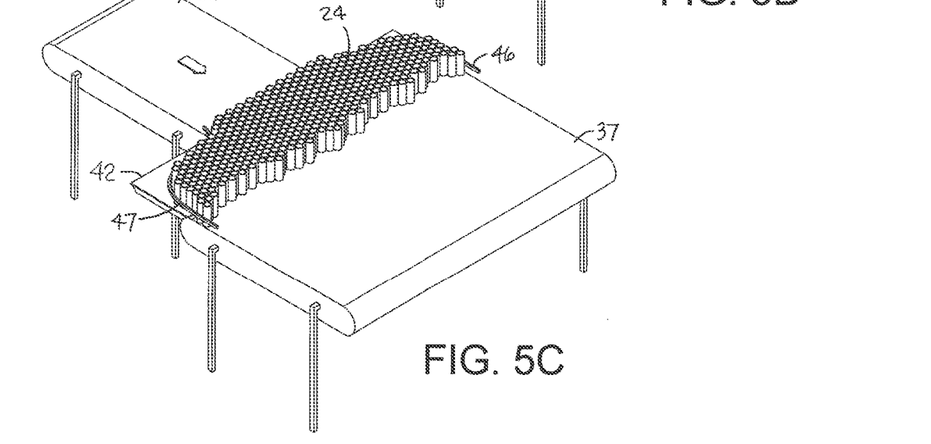

FIGS. 5A-5C illustrate sequentially the operation of the means for spreading in a conveyor system as in FIG. 3 or FIG. 4 in conjunction with a pair of side rails 46, 47. A mass of aluminum cans 24 is advanced by the upstream conveyor 22 in the conveying direction 26 onto the transfer plate 42, as shown in FIG. 5A. The LIM spreads the cans laterally and advances them in the conveying direction across the outer conveying surface 39 of the transfer device 42, as shown in FIG. 5B. The spreading cans 24 are confined within the pair of side rails 46, 47, which diverge from a narrow input end 48 to a wider output end 49 near the downstream conveyor 37. As shown in FIG. 5C, the cans 24 spread out on the transfer plate 42 to more or less fill the space between the pair of side rails 46, 47. The linear-motor stators, along with the backpressure of the mass of cans continuously supplied by the upstream conveyor 36, push the spread-out cans onto the wider downstream conveyor 37.

FIG. 5A also shows that the side rails 46, 47 can optionally be driven by an actuator 43, such as a linear actuator, to clear cans stranded on the deadplate 42 when the upstream conveyor 36 is stopped. The actuator 43 translates the side rails 46, 47 in the conveying direction 26 to clear the deadplate 42, then translates the side rails in the opposite direction to return the deadplate to its home position shown in the drawing. The active-rail system is especially useful with a transfer device as in FIG. 3, in which none of the LIMs is arranged to push cans in the conveying direction.

Figures 6, 7:
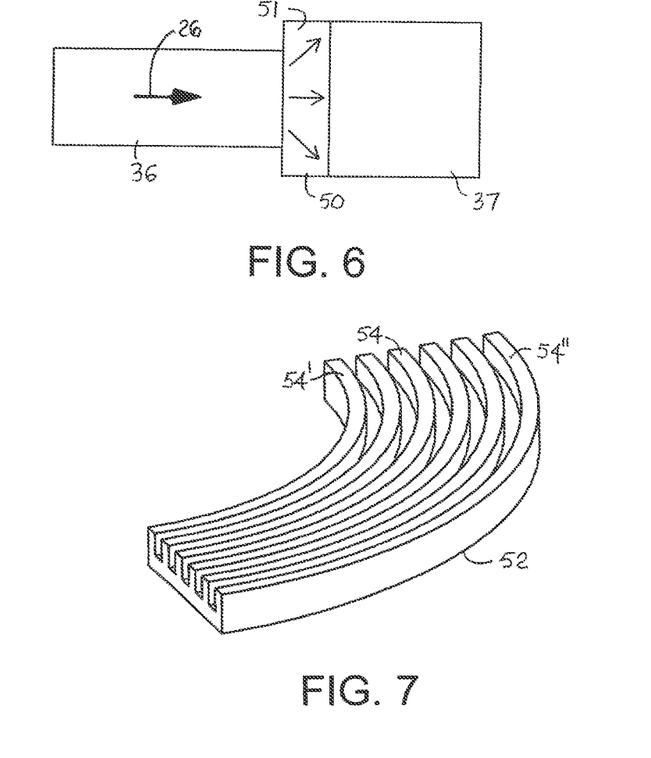
FIG. 6 is a top plan view of a transfer conveyor system as in FIG. 4, but with a linear-motor stator designed to urge aluminum cans in diverging directions.
FIG. 7 is a perspective view of the coil form of the curved linear-motor stator of FIG. 6 with the windings removed for drawing clarity.

FIGS. 6 and 7 depict another version of a LIM can-spreading transfer device 50 that simultaneously spreads cans laterally and advances them in the conveying direction 26 as indicated by the diverging set of arrows on the transfer plate. In this means for spreading, the diverging lines of force are produced by a linear-motor stator 52 under the transfer plate's top conveying surface 51. The coil form of the stator 52 is shown in FIG. 7 with the windings removed for clarity. The stator 52 has parallel, nonlinear poles 54 spaced apart radially from a shortest pole 54' at the entrance to the transfer device 50 to a longest pole 54" at the exit of the transfer device. In this example the stator poles are illustrated as segments of concentric circles. The linear-motor stator's poles 54 cause the cans received from the narrow infeed conveyor 22 to spread out and advance to the wider downstream discharge conveyor 37.

Figure 8A:
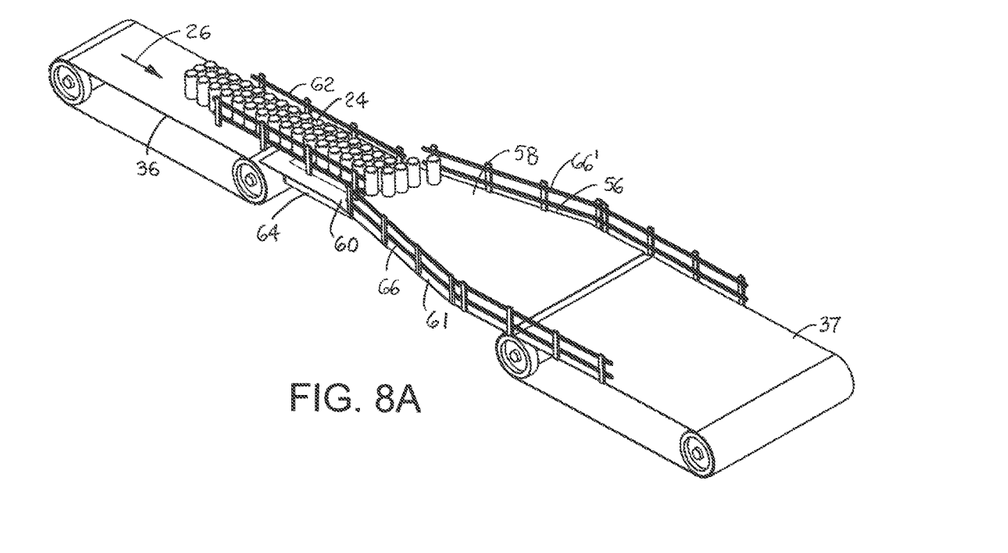
FIGS. 8A and 8B are isometric views of another version of a transfer conveyor system embodying features of the invention including static diverging side rails and illustrating the spreading of cans.
Figure 8B:
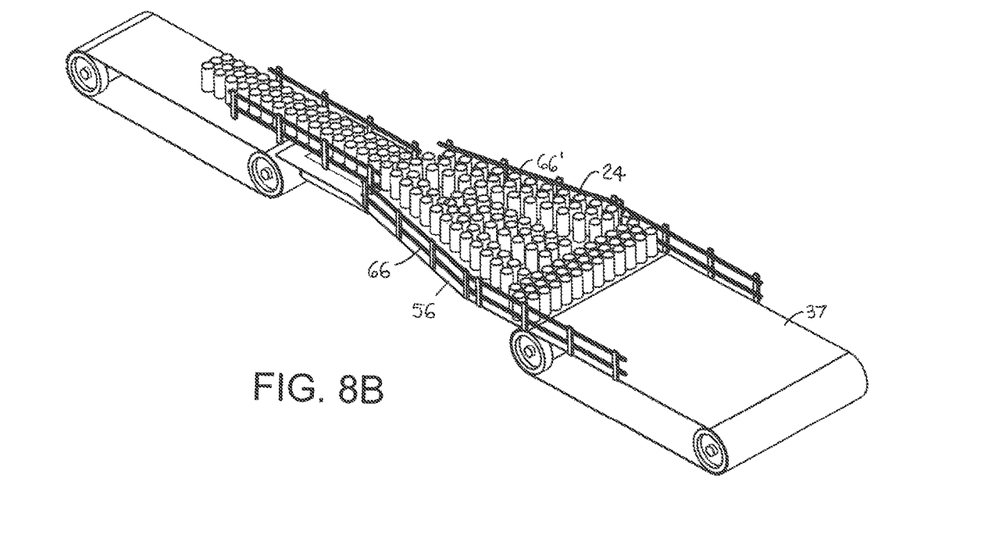
Figure 9:
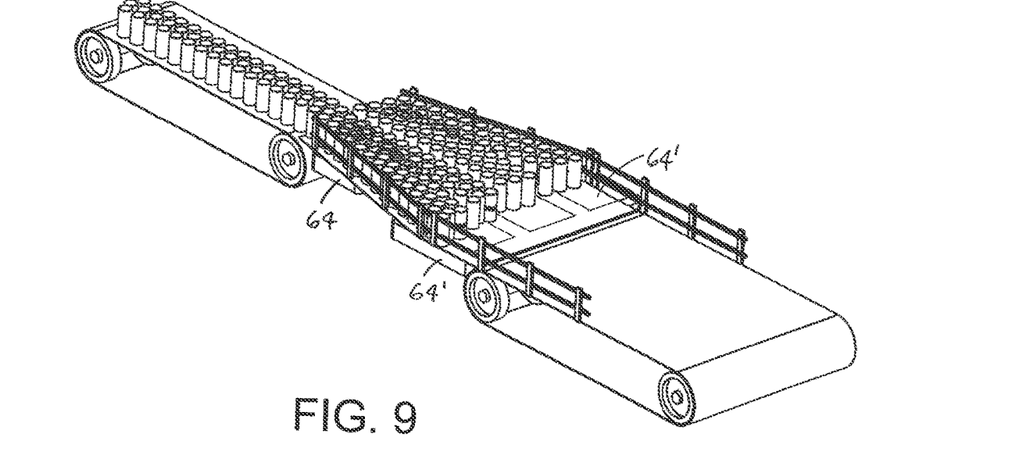
FIG. 9 is an isometric view of a transfer conveyor system as in FIGS. 8A and 8B with diverging side rails and multiple linear-motor stators along the length of an elongated transfer plate.

The conveyor system of FIGS. 8A and 8B uses a transfer plate 56 with a fan-shaped outer conveying surface 58 as means for spreading. The conveying surface is narrow at an upstream portion 60 and widens in a downstream portion 61 to a width roughly equal to the width of the downstream discharge conveyor 37. Static guide rails 62 extend from the upstream conveyor 36 to the upstream portion of the transfer plate 56. The two guide rails 62 confine the mass of aluminum cans 24 to a narrow flow onto the transfer plate. A linear-motor stator 64 under the outer conveying surface 58 propels the cans in the conveying direction 26. A diverging pair of static side rails 66, 66' at the sides of the fanning-out downstream portion 61 of the conveying surface 58 allows the cans to spread laterally as they are pushed along by cans being propelled by the LIM 64 and by the backpressure from cans on the upstream conveyor 36. As shown in FIG. 8B, the spread-out cans 24 confined by the pair of static side rails 66, 66'on the transfer plate 56 are delivered to the wider discharge conveyor 37 downstream. To further urge the cans along the transfer device 56, additional LIM stators 64' can be positioned under the downstream portion 61, as shown in FIG. 9. Even with the LIM stators de-energized or absent, the backpressure is sufficient to spread cans in this version of the transfer system.

Figure 10:
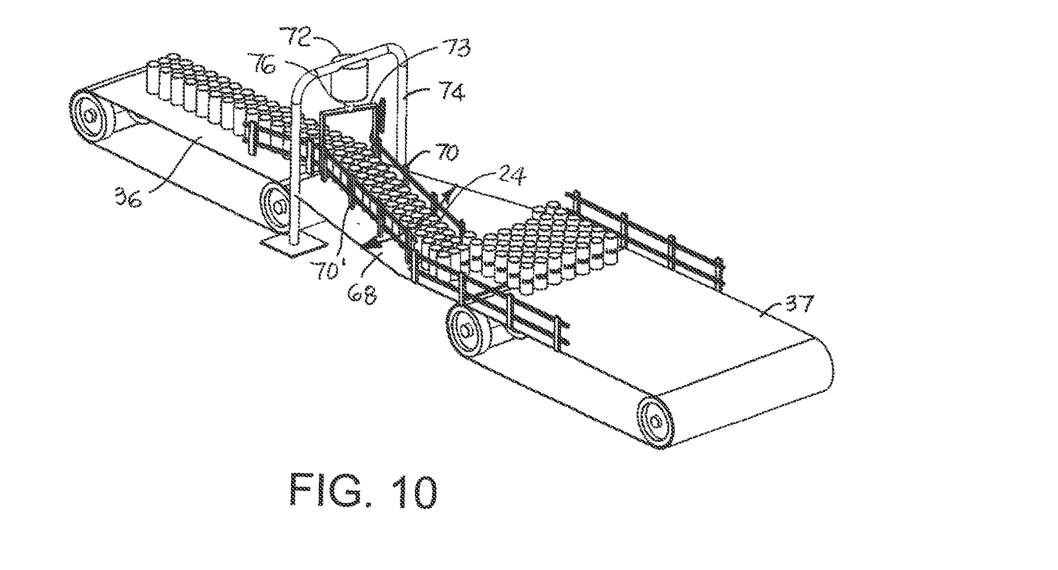
FIG. 10 is an isometric view of another version of a transfer conveyor as in FIG. 8A or FIG. 9, but with a pivotable pair of side rails along the transfer plate.

Spreading is achieved in the transfer conveyor system of FIG. 10 without benefit of a linear-motor stator. A pivoting guide-rail system is used to distribute cans across a deadplate 68. A pair of parallel guide rails 70, 70' are coupled to a rotary motor 72 by a yoke 73. Each end of the yoke 73 is attached to one of the guide rails 70, 70'. The motor 72 is supported in a support frame 74. The motor oscillates the guide rails 70, 70' back and forth about a pivot 76 defined by the motor shaft. The oscillating motion distributes the cans 24 exiting the end of the guide rails across the width of the wide downstream portion 61 of the deadplate 68. The cans are pushed through the passage between the guide rails by the backpressure of the cans on the upstream conveyor 36 in this mechanical means for spreading. The spread-out cans 24 at the downstream end of the deadplate 68 are pushed by backpressure onto the wider discharge conveyor 37.

Figure 11:
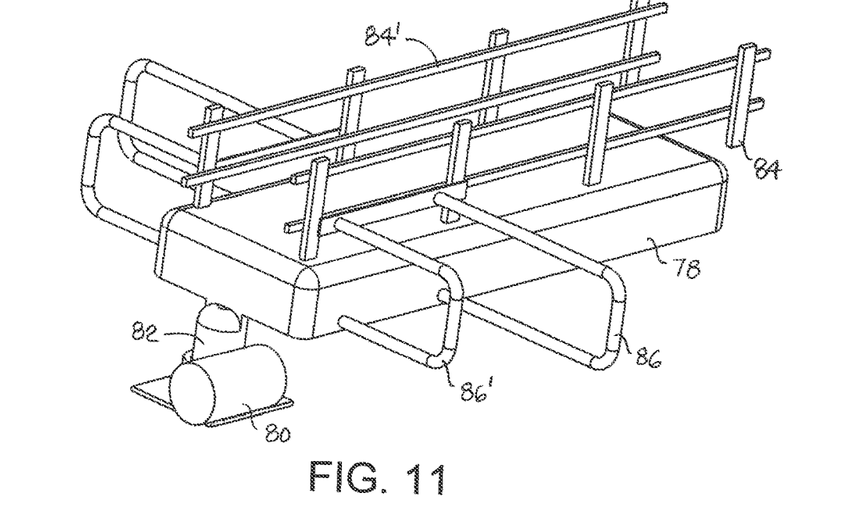
FIG. 11 is an enlarged isometric view of a motor-pivoted linear-motor stator and a side-rail pair usable in a transfer conveyor embodying features of the invention.
Figures 12A, 12B:
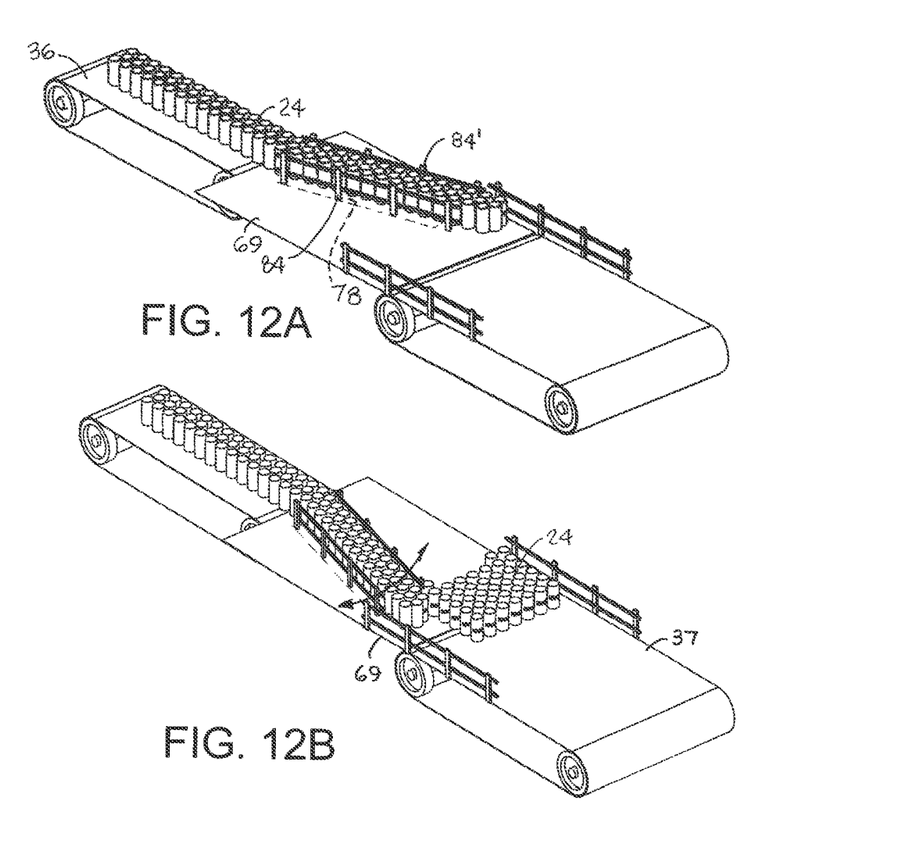
FIGS. 12A and 12B are isometric views of a transfer conveyor using a pivoting linear-motor stator as in FIG. 11 illustrating can-spreading.

Another version of a LIM-propelled means for spreading is shown in FIGS. 11, 12A, and 12B. In this version, the linear-motor stator 78 is coupled to a rotary motor 80 at a pivot 82. Two parallel guide rails 84, 84' are suspended above the LIM stator 78 by attachment arms 86, 86' connected at one end to the stator and at the other end to the guide rails. (The attachment arms are not shown in FIGS. 12A and 12B to simplify the drawings.) As shown in FIG. 12A, cans 24 are pushed by the narrow upstream conveyor 36 between the pair of guide rails 84, 84'. The rotary motor 80 oscillates the guide rails back and forth about the pivot 82 to distribute the cans exiting the rails across the width of the deadplate 69, which is between the stator 78 and the rails 84, 84'. The accumulated spread-out cans 24 at the end of the deadplate 69 are pushed onto the discharge conveyor 37 by the electromagnetic propulsion force of the pivoting LIM and the backpressure of the mass of cans, as shown in FIG. 12B.

Figure 13:
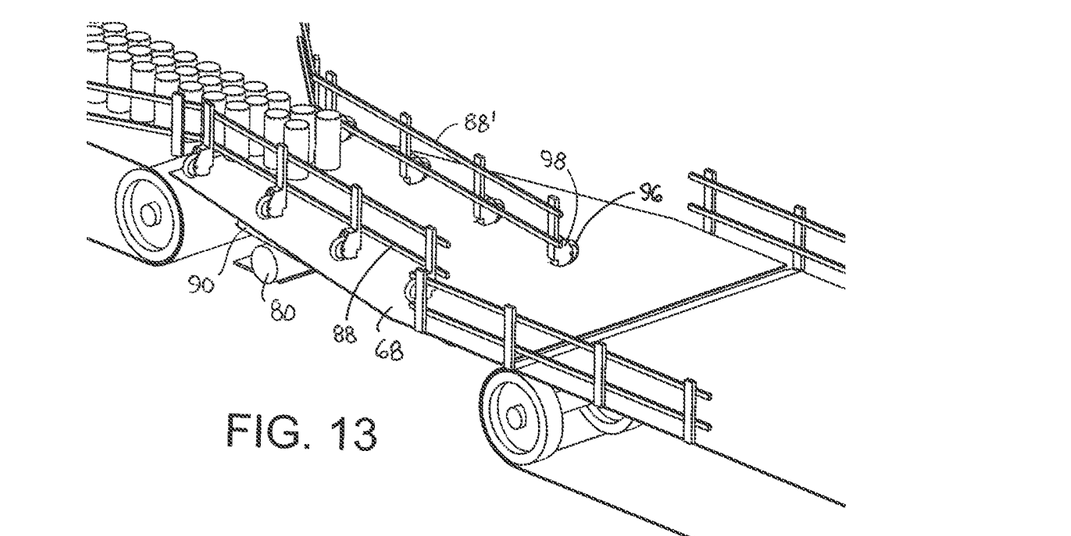
FIG. 13 is an isometric view of the transfer portion of a transfer conveyor system embodying features of the invention including magnetically pivoted rails pivoted together with a linear-motor stator.
Figure 14:
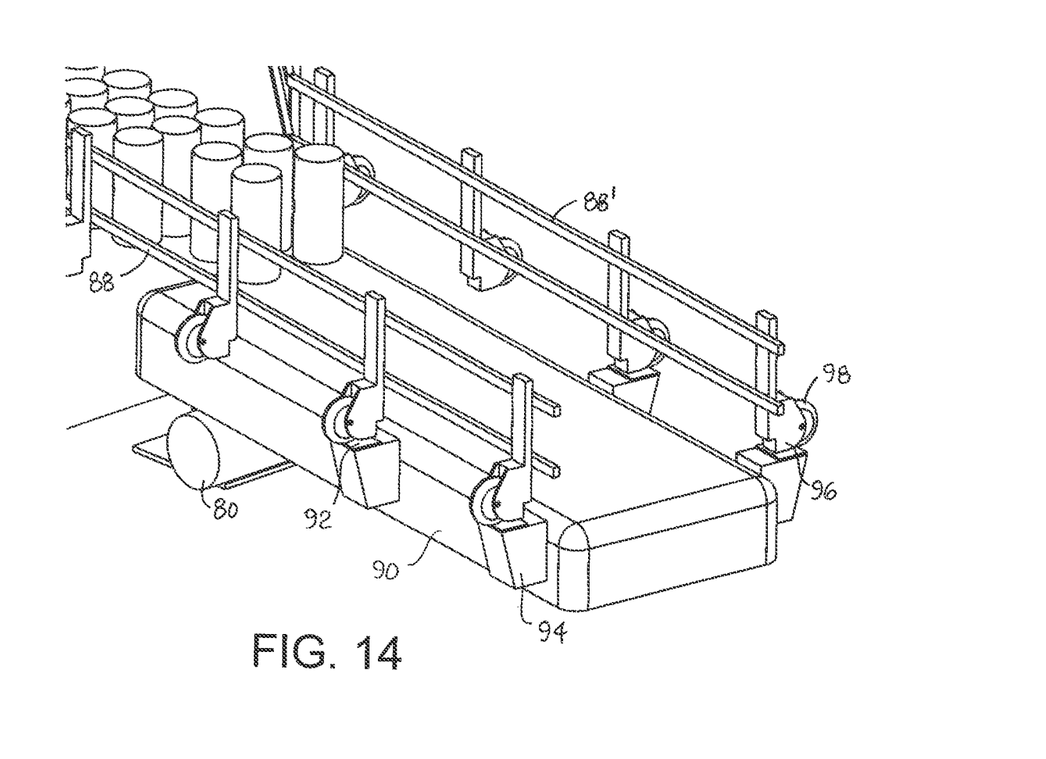
FIG. 14 is an isometric view of the transfer portion of FIG. 13 with the deadplate removed for clarity.

Another pivoting pair of guide rails 88, 88' is shown in FIGS. 13 and 14. Instead of being mechanically coupled by arms 86, 86' to the LIM stator 78 as are the guide rails 84, 84' in FIG. 11, the guide rails 88, 88' are magnetically coupled to a LIM stator 90. Like the stator 78 of FIG. 11, the linear-motor stator 90 is pivoted back and forth about a pivot by a rotary motor 80 mounted in the conveyor frame. Permanent magnets 92 mounted on the tops of platforms 94 along the sides of the stator assembly 90 attract steel brackets 96 in which wheels 98 are supported. Thus, the guide rails 88, 88' pivot back and forth on their wheels 98 across the deadplate 68 with the stator 90 to distribute cans across the width of the downstream portion of the deadplate in this means for spreading.

Figure 15:
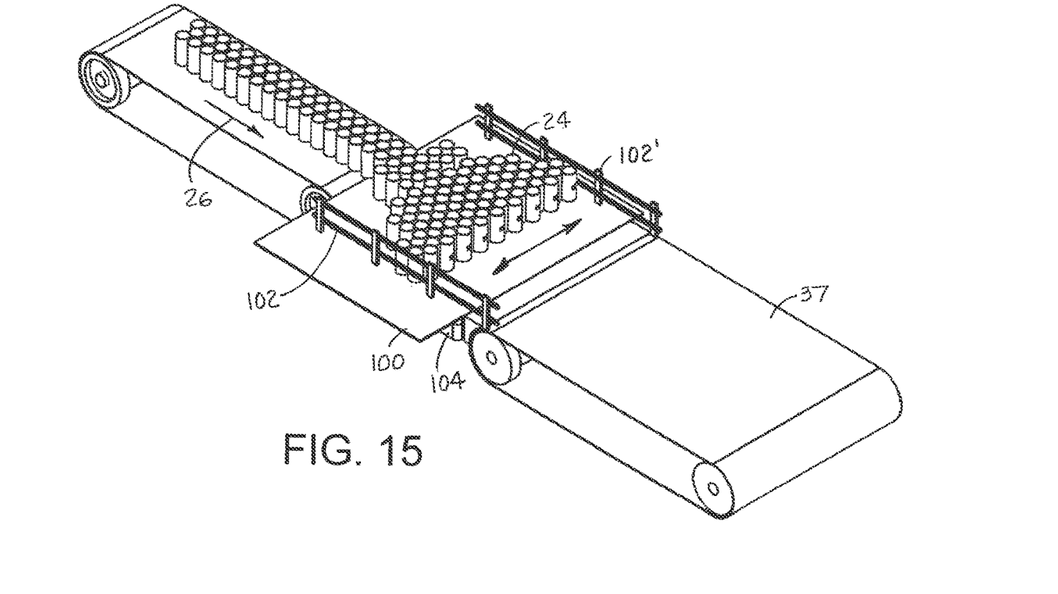
FIG. 15 is an isometric view of another version of a transfer conveyor system embodying features of the invention including a laterally reciprocating transfer plate.

Instead of using a linear-motor stator to spread cans, the conveyor system in FIG. 15 spreads cans 24 by reciprocating a deadplate 100 back and forth laterally under a pair of side rails 102, 102'. A linear actuator or a rack gear, for example, can be used to translate the deadplate 100. One or more linear-motor stators 104 below the deadplate 100 are arranged to propagate electromagnetic waves in the conveying direction 26 to urge the cans along the deadplate 100 and onto the discharge conveyor 37 in this means for spreading.

Figure 17:
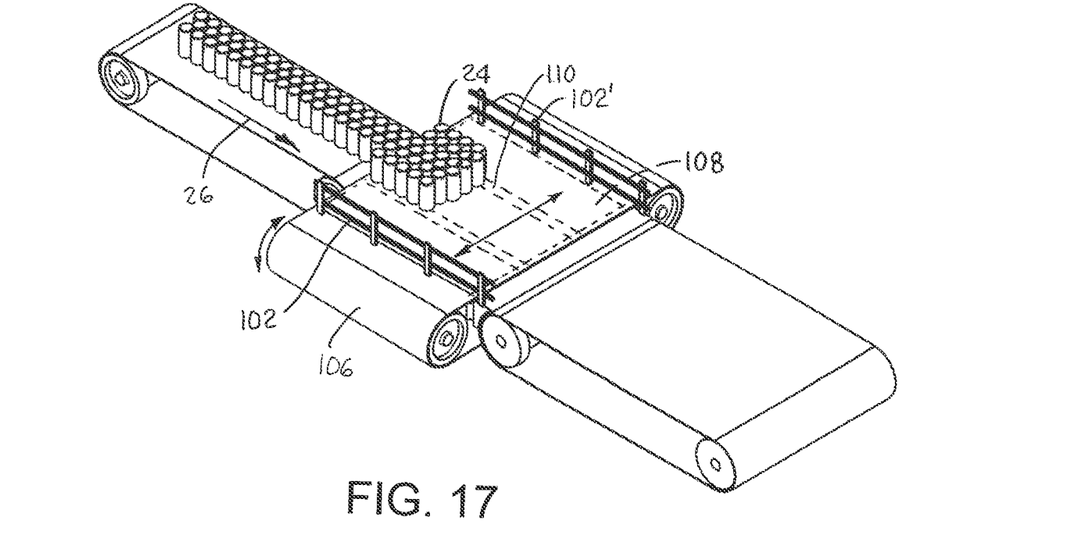
FIG. 17 is an isometric view of another version of a transfer conveyor system embodying features of the invention including a transfer conveyor belt advancing perpendicular to the conveyor direction to spread cans across the width of the transfer conveyor system.

The conveyor system of FIG. 17 is similar to that of FIG. 15, except that the deadplate and actuator are replaced by a motor-driven conveyor belt 106 arranged to move back and forth as means for spreading the cans 24 across the width of the transfer section between opposite side rails 102, 102'. Like the linear-motor stators 104 in FIG. 15, linear-motor stators 108 under the continuous outer conveying surface 110 of the belt 106 are arranged to propel the cans 24 in the conveying direction 26.

Figure 16:
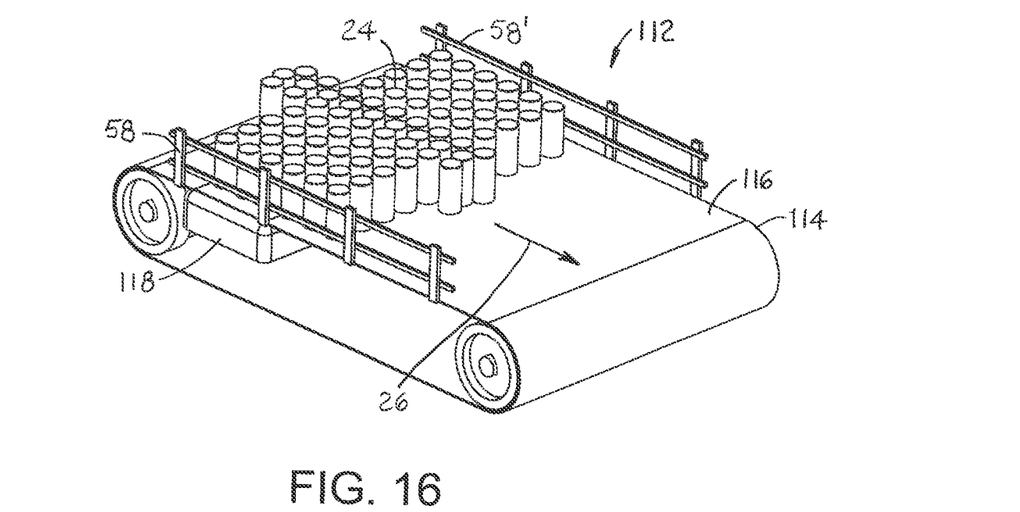
FIG. 16 is an isometric view of another version of a transfer conveyor system embodying features of the invention including a transfer conveyor belt advancing cans in the conveying direction and a linear motor stator below the belt's conveying surface.

The transfer device 112 shown in FIG. 16 uses a motor-driven conveyor belt 114 that transports cans 24 in the conveying direction 26 atop the belt's continuous outer conveying surface 116. A linear-motor stator 118 below the belt's top conveying surface 116 is arranged to produce laterally traveling electromagnetic waves that spread the cans 24 across the width of the transfer device 112 between a pair of static side rails 58, 58' in this means for spreading.

What is claimed is:

1. A conveyor system comprising:
   a first conveyor for conveying a mass of electrically conductive articles confined to a first width;
   a continuous conveying surface extending from the first conveyor in a conveying direction to receive the mass of electrically conductive articles from the first conveyor;
   means for spreading the mass of electrically conductive articles from the first width to a wider second width on the continuous conveying surface;
   a second conveyor for receiving the mass of electrically conductive articles spread to the second width from the continuous conveying surface;
   wherein the means for spreading comprises a linear-motor stator arranged to generate an electromagnetic flux wave traveling along the continuous conveying surface between an upstream end near the first conveyor and a downstream end nearer the second conveyor; and
   wherein the electromagnetic flux wave induces eddy currents creating fields in the electrically conductive articles that interact with the electromagnetic flux wave to produce a force against the electrically conductive articles to push the electrically conductive articles along the continuous conveying surface as the mass of electrically conductive articles spreads across the width of the continuous conveying surface and advances toward the second conveyor.

2. A conveyor system as in claim 1 wherein the means for spreading further comprises:
   a pair of side rails spaced apart across the width of the continuous conveying surface and diverging from the first width near the first conveyor to the second width nearer the second conveyor.

3. A conveyor system as in claim 1 wherein the means for spreading further comprises:
   a rotary drive coupled to the linear-motor stator to vary the orientation of the stator and the electromagnetic flux wave back and forth across the width of the continuous conveying surface.

4. A conveyor system as in claim 3 further comprising a pair of side rails spaced apart across the width of the continuous conveying surface and extending from a upstream end near the first conveyor to a downstream end nearer the second conveyor, wherein the orientation of the pair of side rails varies with the orientation of the linear-motor stator.

5. A conveyor system as in claim 4 wherein the pair of side rails are mechanically coupled to the rotary drive.

6. A conveyor system as in claim 4 wherein the pair of side rails are magnetically coupled to the rotary drive and have rollers that ride on the continuous conveying surface as the orientation is varied.

7. A conveyor system as in claim 1 wherein the means for spreading further comprises:
a drive translating the continuous conveying surface back and forth in a direction transverse to the conveying direction to spread the mass of electrically conductive articles across the width of the continuous conveying surface as the mass of electrically conductive articles is being spread across the width of the continuous conveying surface.

8. A conveyor system as in claim 7 wherein the continuous conveying surface is provided on a deadplate.

9. A conveyor system as in claim 7 wherein the continuous conveying surface is provided on a conveyor belt translatable back and forth in a direction transverse to the conveying direction.

10. A conveyor system as in claim 1 wherein:
the linear-motor stator has a plurality of non-linear poles arranged to generate an electromagnetic flux pattern having flux lines whose directions diverge along the continuous conveying surface from an upstream end near the first conveyor to a downstream end nearer the second conveyor; and
the electromagnetic flux pattern induces eddy currents creating fields in the electrically conductive articles that interact with the electromagnetic flux pattern to produce a force against the electrically conductive articles in the directions of the flux lines to spread the electrically conductive articles across the width of the continuous conveying surface while advancing the electrically conductive articles toward the downstream conveyor.

11. A conveyor system as in claim 1 further comprising a pair of curved side rails each disposed along an opposite side of the continuous conveying surface and an actuator coupled to the pair of side rails to selectively translate the side rails toward the second conveyor to push stranded electrically conductive articles off the continuous conveying surface and onto the second conveyor.

12. A conveyor system as in claim 1 further comprising a pair of diverging side rails each disposed along an opposite side of the continuous conveying surface wherein the continuous conveying surface fans out from a narrow end nearer the first conveyor to a wider end nearer the second conveyor.

* * * * *